April 8, 1947. R. C. DU PONT 2,418,702
METHOD AND APPARATUS FOR LAUNCHING AIRCRAFT
Filed March 9, 1943 8 Sheets-Sheet 2
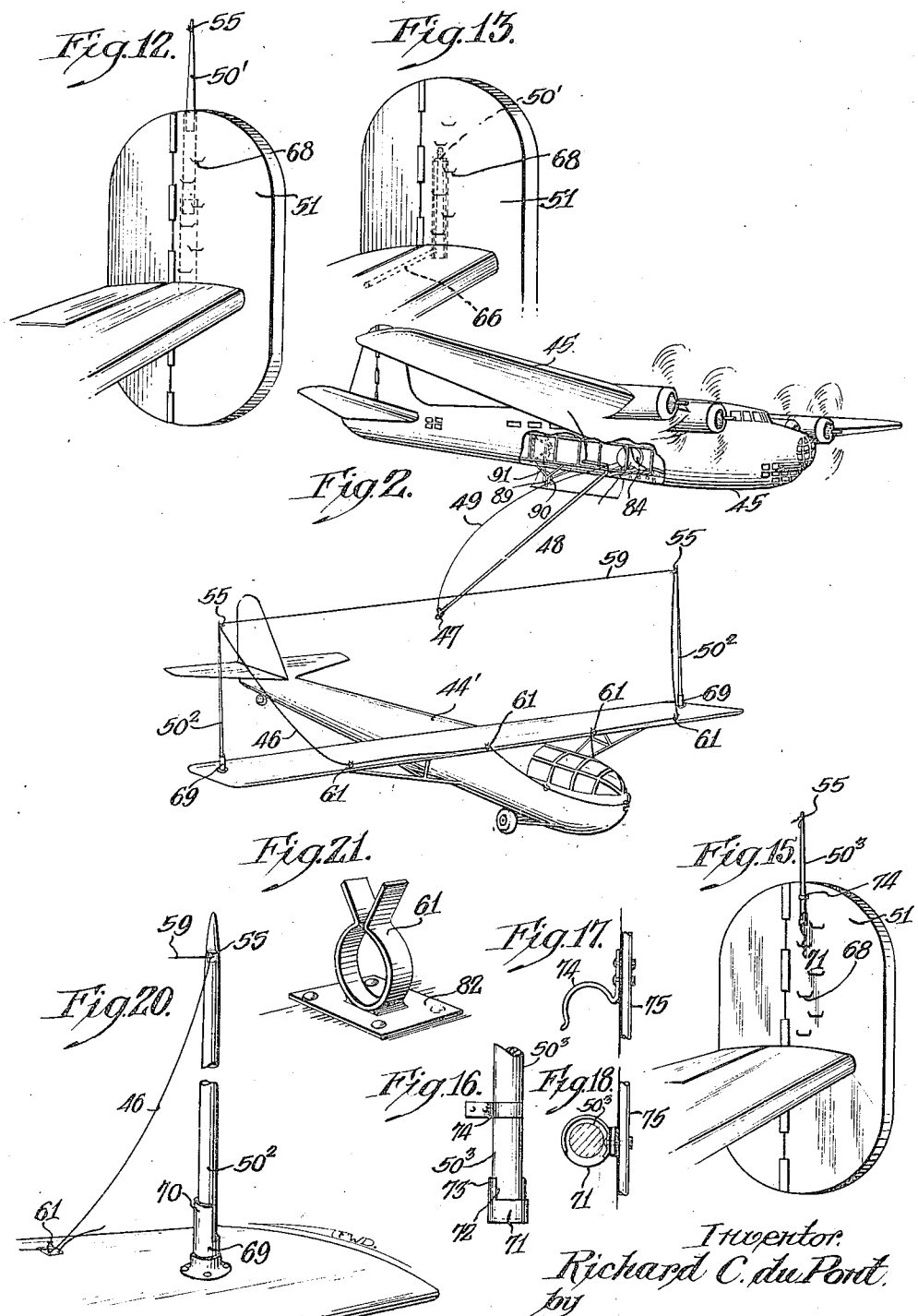
Inventor.
Richard C. du Pont

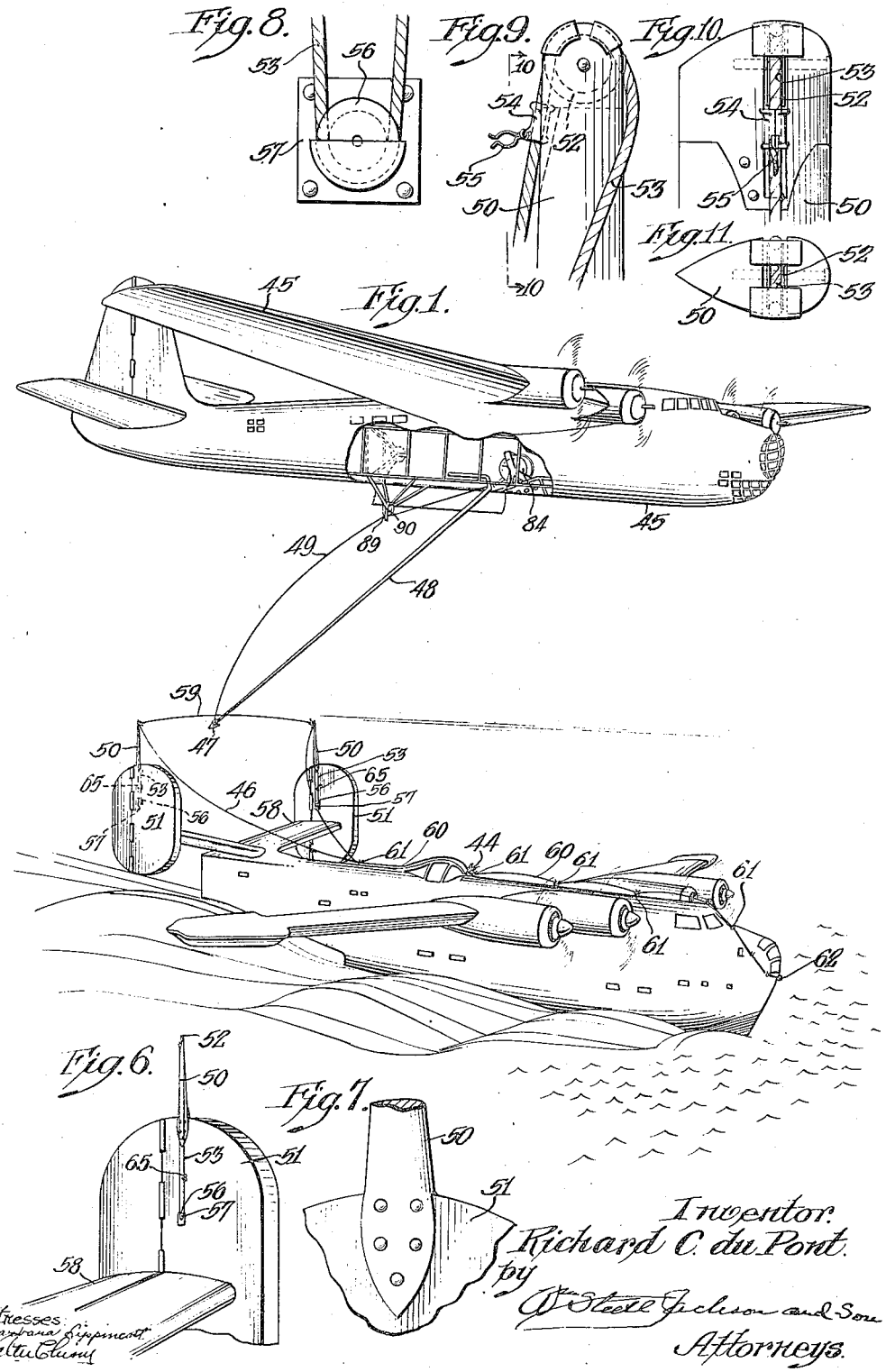

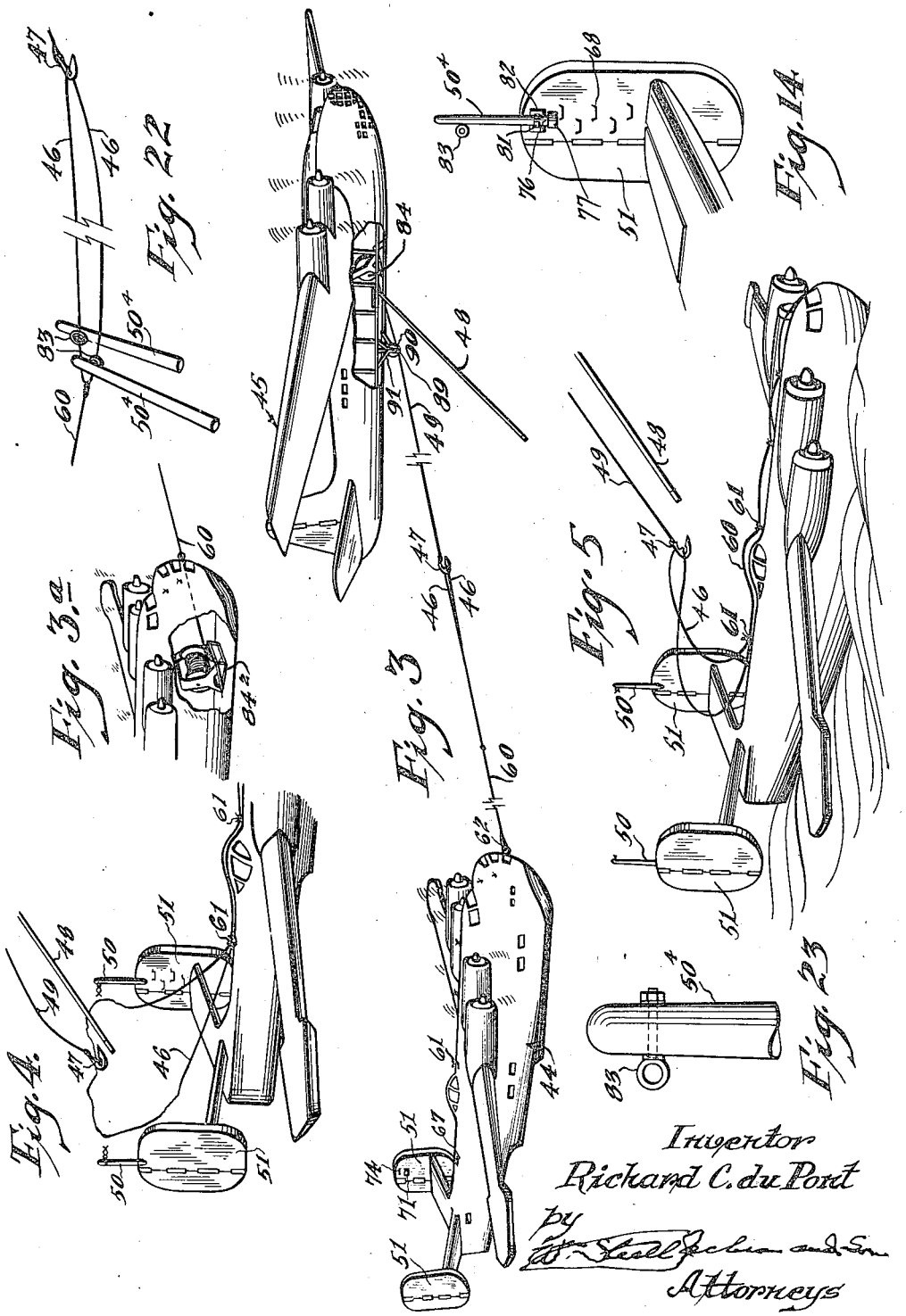

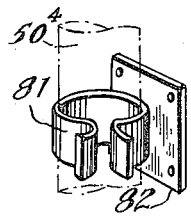
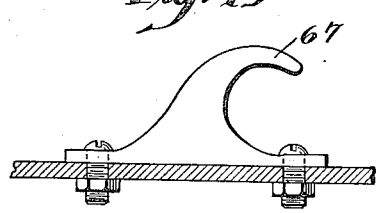
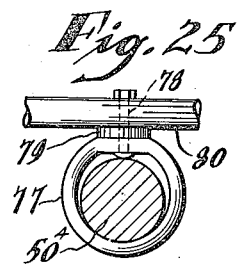
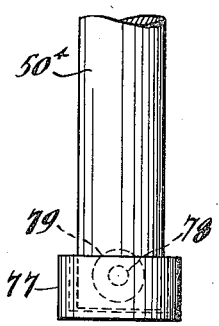
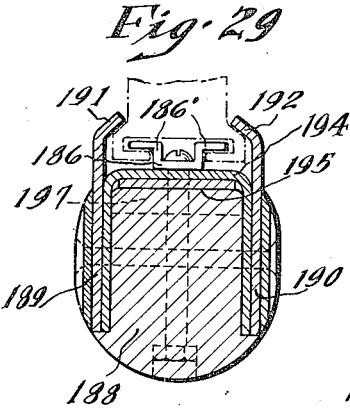
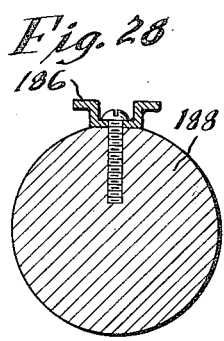
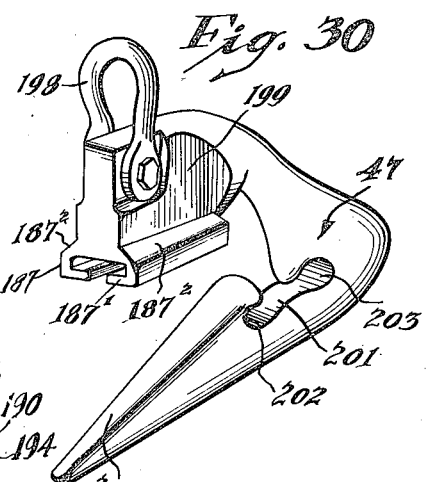
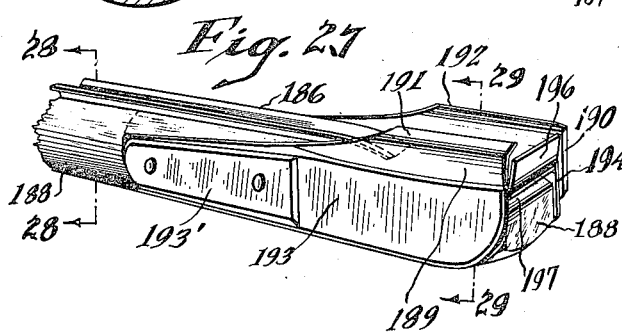

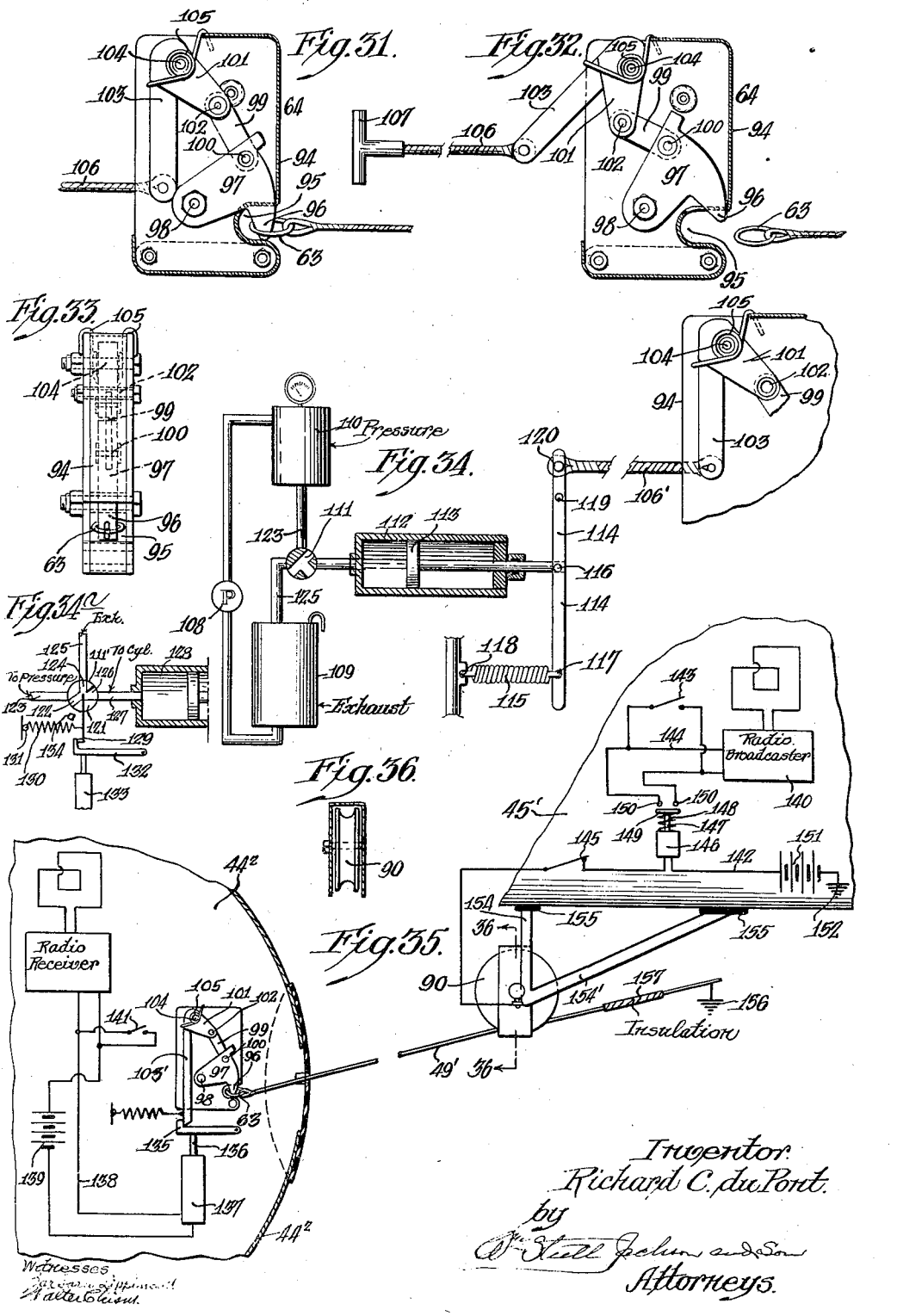

April 8, 1947. R. C. DU PONT 2,418,702
METHOD AND APPARATUS FOR LAUNCHING AIRCRAFT
Filed March 9, 1943 8 Sheets-Sheet 6

Inventor.
Richard C. duPont.
by
Attorneys.

April 8, 1947. R. C. DU PONT 2,418,702
METHOD AND APPARATUS FOR LAUNCHING AIRCRAFT
Filed March 9, 1943 8 Sheets-Sheet 8

Inventor.
Richard C. duPont
by
Attorneys.

Patented Apr. 8, 1947

2,418,702

UNITED STATES PATENT OFFICE 2,418,702

METHOD AND APPARATUS FOR LAUNCHING AIRCRAFT

Richard C. du Pont, Granogue, Del., assignor to All American Aviation, Inc., Wilmington, Del., a corporation of Delaware Application March 9, 1943, Serial No. 478,517

26 Claims. (Cl. 244—63)

My invention relates to mechanisms and methods for launching a glider or a powered aircraft by means of another aircraft.

It is the purpose of my invention to provide a method of launching either gliders or powered aircraft which will be efficient, safe and foolproof particularly when used with large aircraft. It is particularly useful in assisting in launching powered aircraft and gliders which are in motion when launching contact is made.

A further object of my invention is to provide a method and apparatus for launching either a glider or a powered aircraft from water.

A further object of my invention is to provide a method and apparatus whereby powered aircraft will be enabled to take-off from a location which because of its small size or because of the overloaded condition of the aircraft, would not permit normal unassisted take-off.

A further object is to provide a method and apparatus whereby the pay load or the cruising range of aircraft may be greatly increased.

A further object is to provide means whereby the pickup line or loop may be supported in a position for engagement entirely independently of the type of surrounding terrain.

A further object is to provide safety devices for the technique of assisting the take-off of aircraft to render said technique safe and practical.

A further purpose is to use the special energy absorbing and elongation qualities characteristic of Nylon, "Laminite," "Saran," "Vee Plastic" and other synthetic fibers in the tow line to relieve the shock of impact in the launching operation.

Further purposes will appear in the specifications and in the claims.

My invention relates not only to the methods involved but to mechanism by which these methods may be carried out.

In the drawings I have preferred to illustrate main forms and also sufficient detail to show various ways in which the methods may be carried out.

Figures 1, 2 and 3 are perspective views showing towing aircraft (tugs) and aircraft which are being launched, in various positions, illustrating the launching operation.

Figure 3ᵃ is a fragmentary view similar to a part of Figure 3 but showing an assisted aircraft which carries supplemental tow line drum, brake and rewind mechanism for payout, and rewinding.

Figures 4 and 5 are fragmentary, perspective, largely diagrammatic views of successive positions during a pick-up.

Figures 6, 12, 13, 14 and 15 are fragmentary, perspective views exhibiting various forms of loop-supporting posts mounted upon rudder assemblies.

Figure 7 is a fragmentary side elevation of a portion of the structure of Figure 6.

Figure 8 is a side elevation of a pulley secured to the rudder assembly in Figure 6.

Figure 9 is a side elevation of the pulley and tip of loop supporting pole in Figure 6.

Figures 10 and 11 are a side elevation and a top plan view, respectively, of part of the structure seen in Figure 9.

Figure 16 is a fragmentary side elevation of posts such as might be used in Figure 15.

Figures 17, 18 and 25 are top plans of fittings of the general type shown in Figures 14, 15, 16 and 24.

Figure 19 is a side elevation of a clip for positioning a loop when releasable poles are used as in Figure 3.

Figure 20 is a perspective view showing a wing-mounted post for supporting a take-off loop, embodying one form of the invention.

Figure 21 is a perspective of a clip and plate by which the loop or leader attached to the towed aircraft may be held removably to a wing or fuselage to permit tension withdrawal.

Figure 22 is a fragmentary, perspective view showing posts which have been removed from the rudder assembly of such a structure as Figure 14 or from a wing mounting.

Figure 23 is a fragmentary elevation of the upper part of one of the posts and post fittings.

Figure 24 is a fragmentary side elevation of a post such as would be used in Figure 14.

Figure 26 is a perspective view of a spring clip for holding the pole in place in Figure 14.

Figure 27 is a perspective view of the tip of a pick-up arm and a mechanism for positioning a pick-up hook.

Figure 28 is a cross section of the arm of Figure 27 on line 28—28.

Figure 29 is a cross section through hook positioning mechanism on lines 29—29.

Figure 30 is a perspective view of a pick-up hook.

Figure 31 is a cross section of the releasing mechanism shown in Figure 35 in the closed or towing position and with a different operating mechanism.

Figure 32 shows the releasing mechanism of Figure 31 in the open or released position.

Figure 33 is an end elevation of the structure seen in Figures 31 and 32.

Figure 34 is a fragmentary diagrammatic view, partly sectioned, showing control mechanism for disconnecting the tow loop for operating the release mechanism of Figures 31 and 32.

Figure 34ª is a diagrammatic view showing a modified form of operation of Figure 34.

Figure 35 is a fragmentary figure, partly in elevation and partly in section, showing radio control for tow line releasing mechanism.

Figure 36 is a cross section showing a sheave wheel seen in Figure 35.

Figure 37:
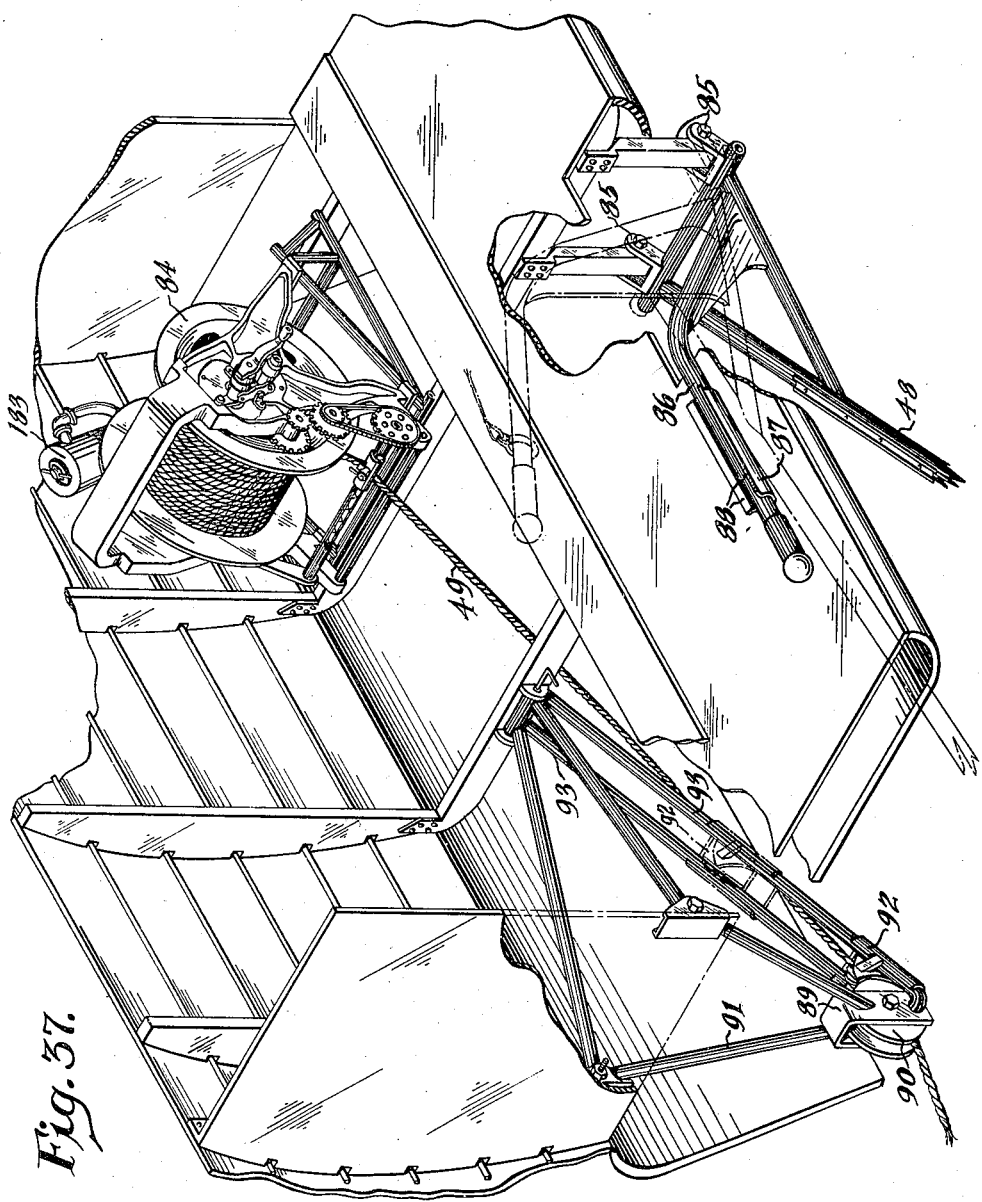

Figure 37 is a fragmentary perspective view showing the installation of pick-up mechanism in the towing aircraft or tug.

Figure 38:
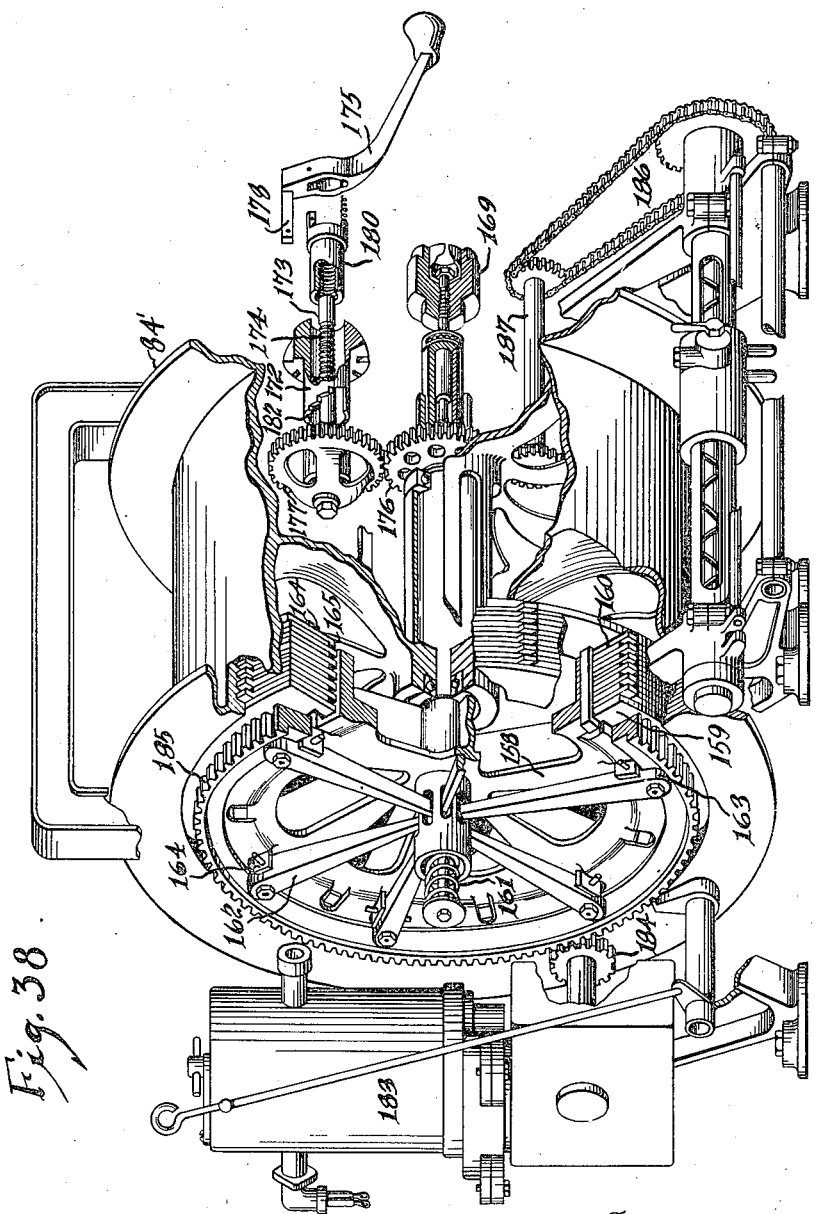

Figure 38 is a perspective view, partly broken away, showing drum and brake mechanism used, slightly modified.

Figure 39:
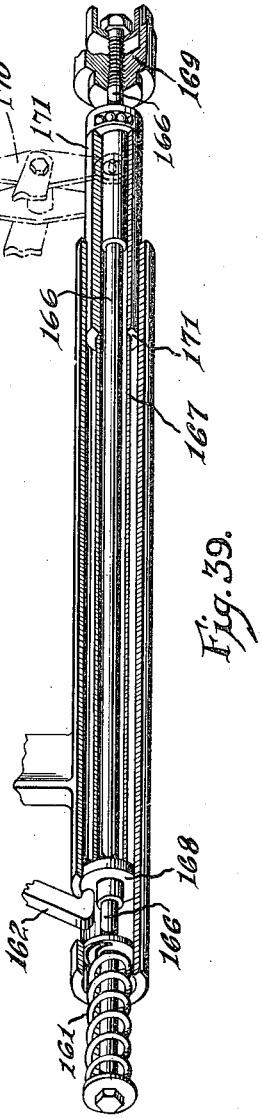
Figure 40:
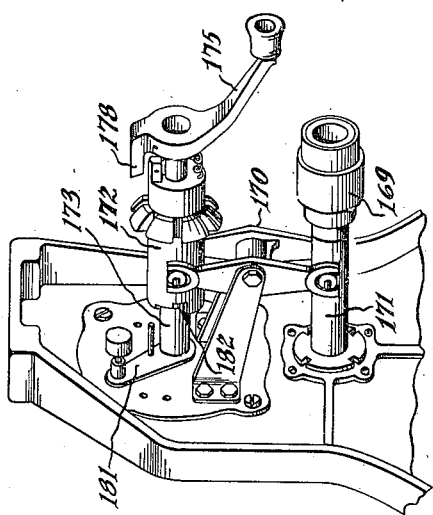

Figures 39 and 40 are fragmentary perspective views of parts of the drum and brake mechanism seen in Figure 38.

Figure 41:
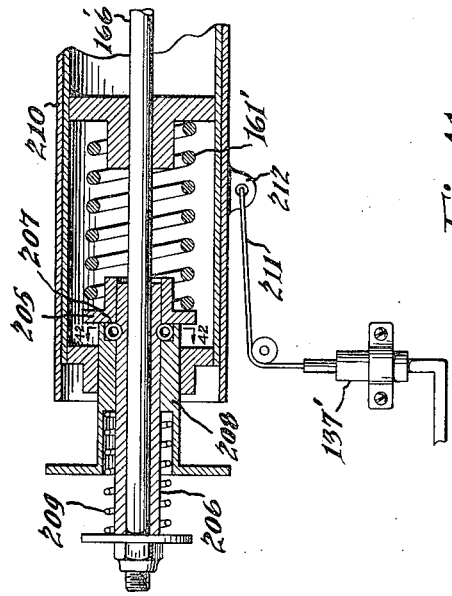

Figure 41 is a fragmentary enlarged longitudinal section of a modified form shown in the structure seen in Figure 39.

Figure 42:
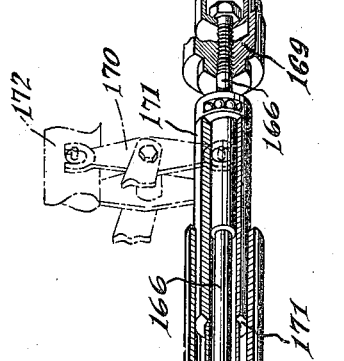

Figure 42 is a section of Figure 41 taken upon line 42—42 of Figure 41.

In the drawings similar numerals indicate like parts.

Figure 1 shows an embodiment of my invention as applied to a multi-engine flying boat indicated in general at 44, which is being launched and which may assist in its launching by a part of its engine power or by all of its engine power. In either case the use of the tug or towing aircraft 45 permits a take-off in a shorter distance than could otherwise be accomplished and in the case of an overload an aircraft can be launched which could not otherwise take off under its own power. The flying boat is provided with a loop 46 which is caught by a hook 47 directed by an arm 48 depending from the tug or towing aircraft.

In use, when the loop 46 has been picked up, the hook 47 disconnects from the arm 48 as hereinafter more fully explained and is supported by a drum-wound towing cable 49.

There is no novelty in the motors, wings, steering mechanism and other aircraft features either of the air tug or of the aircraft launched or towed.

While a loop is illustrated as being the preferred form of tow line connection, it is to be noted that a single line has been used successfully in other types of air pick-up operations and my invention contemplates the use of either a loop or a section of line for this purpose. The term loop will, therefore, be understood to contemplate either an actual loop or a line stretched transversely to the path of the tug and connected with the aircraft being launched.

It is important that the loop or line to be caught by the hook depending from the air tug shall be supported from the aircraft to be launched though it is recognized that the way in which the loop or line is supported may be varied greatly. Because the aircraft to be towed will ordinarily be little suited to furnish the support to the loop directly, it will ordinarily be necessary to supply at least one pole for loop support and it will ordinarily be advantageous to provide two poles for its support. Moreover, because a loop is more convenient and effective this form has been chosen for illustration in order to present the best embodiment of the invention known to applicant.

Whatever the character of support, whether attached to the plane or detachable therefrom, there is a distinct advantage in mounting the support upon the upper part of the structure of the aircraft towed; this is true whether the aircraft be sea-borne or land-borne before launching.

With sea-borne aircraft, there is inherent difficulty in supporting a loop for positive engagement by the tug aircraft unless loop supports are carried by the aircraft to be launched. This is true even when the aircraft to be launched does not assist in the launching, and it is particularly true when there is to be assistance in the launching by the use of part or all of the power of the aircraft launched or by a sea-borne tug before actual pick-up contact is made.

Mounting of loop supports upon the aircraft applies not only to an assisted take-off where the seaplane or land plane assisted is in motion at the time of contact but to a pick-up where the seaplane or land plane is stationary at the time of contact and whether the aircraft launched be a powered aircraft or a glider.

Mounting the loop upon the aircraft launched would apply also whether the aircraft launched be given motion by reason of its own power or independently as by use of a tractor or tug boat. In either of these cases land mounted poles would be unsuitable.

Considering next a variety of general classes of poles which may be used and which are illustrated, I will describe first the poles which are carried permanently by the aircraft to be launched, and then I will describe poles which are mounted initially upon the aircraft to be launched but which either are cast off from it altogether or are removed from it by the loop.

In Figure 1 the loop is stretched between poles 50 permanently mounted upon vertical fins 51.

In the form shown in Figures 6, 7, 8, 9, 10 and 11 the tips of the poles 50 carry sheathed pulleys 52 around which are threaded an endless line 53. To this line is attached a clamp 54 having a flexibly mounted spring clip 55 near its lower edge. The upper edge of the clamp 54 is flared to prevent it from passing over the pulley 52.

The lower part of the endless line 53 passes around a second sheathed pulley 56 attached to a plate 57, seen in Figure 8. It is located at an accessible portion of the lower inside surface of the vertical fin 51 with the axis of the second pulley at 90° angle with respect to the axis of the first pulley. An operator can raise and lower the clip 55 while he is standing upon the tail surface 58, thus permitting him to insert the loop 46 or separated parts of a line within spaced clips 55 reliably and conveniently.

Figures 6, 7, 8, 9, 10 and 11 illustrate the construction of one of the poles 50 shown in Figure 1. Since these poles are permanently attached to the vertical fins, they are made in streamlined shape as shown in Figure 11 in order to reduce the air drag.

Portions of loop 46 at opposite fins are removably held in the clips 55, between which clips the loop is stretched to present a reasonably taut transverse stretch 59 for engagement by the pick-up hook 47.

On each side of the transverse stretch the loop terminates in a leader 60 which is threaded detachably through open brackets 61 to a point near the nose of the flying boat at which point it, or a fitting attached to it, is secured to the boat for towing purposes. The brackets prevent fouling in this form and in other forms.

The attachment can be by a noose 62 in the end of the leader itself in Figure 1, for example, or the leader can be connected to a ring or other fitting 63 as seen in illustrations of disconnecting devices later illustrated.

The noose, ring or other fitting, hereafter called ring is inserted in release mechanism broadly indicated at 64, Figure 31, and which is secured to or upon the structure of the flying boat. The tension in the clips is sufficient to hold the upper transverse stretch of the loop substantially taut and at the same time to permit the loop to release readily from the clips as soon as it has been engaged by the hook. When released from the clips the loop assumes successive positions such as are shown in Figures 4 and 5 and the hook 47 slides from the lower end of arm 48 so as to be supported wholly from towing cable 49, all as more fully later described.

In installations where it may become necessary to prevent endless line 53 from turning in pulleys 52 and 56 after clips 55 have been raised to the tips of the poles, a cleat 65 or other common friction device may be installed to prevent accidental movement of line 53.

Because the poles 50 are mounted each upon the upper end of a fin 51 they can be much shorter than would otherwise be necessary and permanent mounting of these poles upon the aircraft to be launched becomes much less objectionable than the mounting of full length poles.

The present invention offers alternatives to the fixed poles of Figures 6-11, (a) telescopic poles mounted upon the vertical fins; (b) poles wherever mounted which, after use, are cast off wholly from the aircraft; (c) poles which are carried away from the aircraft but remain attached to the loop. Each of these is given for illustrative purposes as an example, a species representing a type.

The variety of means for supporting the loop or tow line illustrates the fact that quite different types of poles and varying operative constructions can be used in practice of the present invention.

A second form of pole, different from the permanently affixed poles of Figure 1 and of Figures 6-11, is shown in Figures 12 and 13. It comprises poles permanently attached to the vertical fins but dropping below their upper ends when not in use, in order to avoid the undesirable air drag attendant upon having poles extending from a portion of the aircraft during flight.

The telescopic poles 50' may be lifted by hand and retained by lateral pull upon them from the loop (line). On account of their size and weight, however, they will ordinarily be operated by fluid pressure in pipe 66. After use, they can be dropped by their own weight when the fluid pressure has been relieved. The loop is removably secured in clips 55 at the upper ends of the poles, of the same general character as those shown in Figure 9.

Where it is the intention to hold the poles in raised position by the lateral and forward pull of the loop, the loop can be held stretched to any extent desired which will not pull it out of the clips and the poles may be held erect by using a loop holder 67 such as appears in Figure 19. The use of such a holder is shown in Figure 3, in which the open end of the holder engaged the end of the loop adjacent the leader prior to contact by the tug, said open end of the holder being directed toward the front of the aircraft so that as the pick-up hook 47 carried initially by arm 48 engages the stretch of the loop and pulls it loose from the clips 55 (Figure 15), carrying the loop forward, this act will loosen the loop from the holder and the continued pull of the pick-up hook 47 upon the loop will pull the loop forwardly out of engagement with the holder.

The steps in this procedure are generally indicated by Figures 3, 4 and 5; however, it will be understood that Figures 4 and 5 illustrate the fixed pole installation of Figure 1 which does not require a holder 67 as would the disposable poles of Figure 15. Figure 3 shows the plane which has been equipped with these disposable poles.

At or before the time the loop is pulled to the position seen in Figure 3 the hook will be disengaged from the arm 48 and will be carried wholly upon towing cable 49 as seen in Figures 3 and 5.

In various figures rungs 68 are shown upon the vertical fins, to serve as steps for access to the upper parts of the vertical fins and the tops of the poles, so that an operator can climb up and insert the loop in the clips at the tips of the poles. In the telescopic form this will ordinarily be done before the poles have been raised to their full height either manually or hydraulically but the rungs are useful in any of the forms showing vertical fins.

Figure 2 illustrates my invention applied to a land glider 44' which, of course, has no engine and which mounts poles $50^2$ near the wing tips of the glider by means of sockets 69 shown in relatively enlarged view in Figure 20. The clips 55 at the tips of the poles $50^2$ are or may be identical with corresponding clips seen in Figure 9.

The poles $50^2$ are wholly removable and rest in the sockets 69 and against shields 70 in such a way that they may be held in place against premature loss by the tension of the loop. This may require the use of additional lateral spring tension on the loop in clips 61 nearest to the poles.

The shields or extensions 70 are preferably located in the direction of the first bracket 61 from the socket recess. The shields retain the poles in an upright position so long as the loop exerts tension upon the poles $50^2$ but at the instant the loop pulls free from the clips and motion is imparted to the glider, the poles $50^2$ will fall out of the sockets, due to a combination of air drag and the forward velocity of the ship. The poles are thus completely discarded and any wind drag or stress during flight is eliminated. The stretch 59 of the loop or line is maintained taut by the friction of the clips 55.

It will be noted that the stretch here and at other points in my disclosure need not be horizontal provided it be accessible for the pick-up hook and does not slope sufficiently in any direction to interfere with reliable pick-up by the hook.

In whatever form, it is desirable that the connection from the loop or line along the surface of the aircraft launched to the point of attachment upon the front of the powered plane or glider shall be held by tension-releasing clips to prevent fouling.

The main tow connection of the loop or line 46 with the towed aircraft is releasable at its point of attachment to the towed aircraft. Both hand and automatic releases for normal and emergency operation will be described hereinafter.

In Figures 15, 16, 17 and 18, disposable poles $50^3$ are shown which are suitable for use upon a powered body such as that in Figure 1. They may be attached to vertical fins as seen in Figure 15 and carry spring clips 55 within which the loop stretch 59 or other line may be supported so as to be tension released.

The detail of this form is shown best in Figures 16 and 17. Sockets 71 similar to the sockets in Figure 20 receive the bases 72 of the poles 50³. The supporting skirts 73 are similar to the shields of Figure 20. The skirts prevent the poles from falling or being removed in the direction of the skirt. The skirts face substantially forwardly. Above the sockets additional straps 74 encircle the poles about 180° carried by convenient spars 75 (Figure 17). Only one of each of the pair of parts is shown.

The straps also support the poles laterally, and in order to prevent the poles from falling backwards when the loop is attached to them, loop holder 67 is mounted on the outer surface of the aircraft in some such position as in Figure 3. Sufficient tension is thus exerted to prevent the poles from falling out.

The loop performs a double function here much as it does in Figures 12 and 13 in that it not only affords a stretch to be picked up by the hook from the air tug but the tension of the loop holds the pole in position as in Figures 15, 16 and 18.

In Figures 14, 22, 23, 24, 25 and 26 still another type of pole and pole connection is shown for detachably supporting loop stretching poles from aircraft to be launched.

In Figure 14 the base 76 of the pole 50⁴ rests in sockets 77 attached to a vertical fin presenting the same general appearance as in other figures herein but with the difference that the pole in this case, though removable, is carried with the loop.

The socket 77 is tiltable about a pin 78 so as to offer easier release for each pole from its socket than otherwise would be the case. The pin passes through a spacing bushing 79 intended to give a bearing surface and permit free release of the pole. It enters the spar 80. Brackets 81 upon plates 82 are mounted slightly above the sockets and support the poles while in place. They have openings which are disposed toward the center of the aircraft in order that the pole may be released readily after contact. The loop is threaded through rings 83 at the pole tips (see Figure 23). The rings 83 thus carry the poles with the loop and securely support the poles from the loop.

When the hook engages the loop 46 the poles are pulled from the supporting brackets and remain with the loop during the further launching and towing operation in some such position as shown in Figure 22.

There is a distinct advantage in this method when launching from the water or from places where the poles otherwise are not readily recoverable.

The different poles illustrated show that the important thing is to support the pick-up line or loop from the aircraft launched or towed, so that the stretch to be picked up is independent of outside surrounding ground or water conditions and will travel with the aircraft to be launched. It may be possible to support the line or loop directly from the aircraft structure at one or two points. The same considerations make it possible that only one pole may be needed and that where a pair of poles is used they need not be of the same type.

Figures 1 and 2 both illustrate a towing aircraft or tug about to launch a second aircraft, the second aircraft in Figure 1 being a powered aircraft which is being launched from the water and Figure 2 showing a glider without power being launched from the ground. Though it is the intention ordinarily to use the motors of a powered aircraft being launched to give the assistance in the launching this cannot be done in the case of Figure 2; and the assistance for the take-off can be provided by a land borne tractor, automobile or other craft for land launchings and in Figure 1 by using a tug or other powered boat in the case of launchings from the water.

After the aircraft has been launched it is towed as illustrated for one tug and tow in Figure 3. The towing cable from the air tug connected with cable-carrying winch drum 84 carried in or on the air tug and is capable of being payed out under increasing friction and reeled in as later explained. In this illustration of Figure 3 the poles have been cast off wholly from the powered aircraft being towed and the connection from it to the leader may be by a noose 62 if desired or by some fitting such as the ring of Figures 31–33.

The parts of the towing connection between a towing aircraft or tug and a towed aircraft or tow are, or permissibly may be, the towing line, which is a drum-wound rope or cable, preferably a steel cable, whose drum, carried by an air tug, has a relatively high inertia, a pick-up hook carried by the towing line, a pick-up loop or line, engaged by the hook, and a leader attached to the loop and to the tow. A leader is not always essential since the loop itself may be attached to the tow as shown in Figure 2.

In case of a large and heavy tow, permissibly the leader will be wound on a drum carried in the tow (Figure 3ᵃ) and from which it may pay out.

When used, the drum for the section of line payed out from the towed craft is ordinarily smaller than the drum carried by the tug and of relatively lower inertia than the inertia of the drum on the tug.

It will thus be apparent that as soon as the loop leader and cable have been pulled taut each one in effect becomes a tow line which is a part of the entire composite tow line or towing connection.

The tow line or towing connection consisting of leader, loop and line carried by the tug may entirely or partly, as desired, be composed of a synthetic or plastic material having inherent shock absorbing qualities. These qualities are found in Nylon, "Laminite," "Vee Plastic" and other fibers as later further explained.

The arm 48, seen best in Figure 37, is attached to the tug by means of a yoke braced at its upper end to provide pivoted spaced bearing supports 85 which rock in the structure of the air tug. To the upper end of the yoke, a handle is attached.

The arm 48 can be raised and lowered by the handle. In pick-up use the arm 48, normally in its lowermost position, sloping rearwardly and downwardly, is held down by the handle. It is not safe to have the arm in this position at all times. Just before or just after the pick-up of an aircraft the air tug may fly quite low. Sometimes also the tug attempts to land while the arm is down. A depending pick-up arm may then be injured by striking an obstruction. For this reason, in Figure 37 the handle used to swing the arm is held down yieldingly by a spring clasp 87 having spring side plates and flared upper edges 88.

When the handle is pressed down to lowermost position it will spread the upper edges and enter the clasp. The tension in the side plates holds the handle down against air pressure and against the force of contact with the pick-up loop but greater pressures will cause the handle to spread the side plates and the arm will lift to upper protected position.

The cable 49 passes to and from the drum 84 through a strap block 89 carrying a guide pulley 90, all mounted upon a retractabl triangular frame structure 91. This frame is adapted to be thrown in counterclockwise direction, swinging through about 90° of angular movement, not shown, to an inactive position.

A spring guide member 92 blocks the space about the pulley from passage of the hook 47 in the position shown but slides upon bracket rods 93 to a position seen in dotted lines in Figure 37 to permit the hook to pass when desired.

In operation as so far described the aircraft to be launched and of which there is to be assisted take-off, is operated by its own power or if it be a glider it is towed by a land borne craft or sea tug, so as to travel across the ground or water by one means or the other to overcome the additional inertia which it would have if stationary and thus to assist as much as possible with the towing aircraft's effort to get it into the air and to tow it to a point where the towing cable can be released.

While the aircraft to be launched is in motion the air tug in flight and with its towing arm 48 depending in position for use, picks up the stretch 59 of the line or loop 48, pulling the line or loop free from the poles or carrying the poles along with the loop and freeing the loop or leader from its temporary attachments along the surface of the towed aircraft. The position of the loop therefore passes from that seen in Figure 1 or Figure 2 through the positions shown diagrammatically in Figures 4 and 5 to that shown in Figure 3.

As soon as any appreciable tension is brought upon the towing cable 49 the cable begins to pay out from the drum, adding such acceleration to the aircraft being launched as has been planned in the friction caused between braking surfaces (as later described in connection with Figures 37–40) which are stationary and those which are carried by the drum. From the time that the combined effects of land or sea taxiing and pull upon cable 49 along with the manipulation of the controls of the aircraft being launched cause the latter to be air borne the aircraft to be launched becomes the aircraft to be towed and the operation is a towing operation best seen in Figure 3.

There still remains the problem of casting off the tow connection from the aircraft being towed by means carried upon the air tug, which will be described in connection with Figures 31–36.

The pick-up of the aircraft being towed by the air tug is made as early in the movement of the former as possible in order that advantage may be taken of both the assistance and the pull of the air tug concurrently for the greatest length of time. The manipulation of the controls of the aircraft being launched is a highly important part in the combined launching effort to secure early and maximum launching effect from the speed attained.

The importance of mounting the tow line or loop of the aircraft to be launched upon said aircraft itself in assisted take-off will be evident because if the towing line or loop were mounted upon stationary poles movement of the aircraft to be launched would risk striking the poles.

It is therefore apparent that mounting the pick-up line or loop upon the aircraft to be launched is a distinct benefit even when assisted take-off is not intended; and this is particularly true when the aircraft to be launched is a water borne aircraft whose surrounding setting makes it difficult or impossible to use fixed loop supporting poles.

After contact has been made between the air tug and the aircraft to be launched the pull of the towing aircraft urges the towed aircraft forward to an extent depending upon the friction of the brake surfaces in the winch as the towing cable pays out from the drum to a predetermined extent as hereinafter explained in connection with Figures 37–40. Progressive increase in the pay-out friction takes place until finally the aircraft towed not only becomes air borne but reaches the speed of the air tug.

There is considerable inertia in the pay-out drum with the result that under some circumstances it does not get started paying out cable as quickly as may be desired. The construction of Figure 3ª relieves this situation by installing pay-out drum equipment in the aircraft to be towed, this secondary drum $82^2$ may have much less inertia and therefore it allows tow line to be payed out during the interval necessary to accelerate the primary drum on the tug.

There is a further possible benefit in the use of the two drums in that a longer total tow line length is available whether the drums have the same inertia or not.

In every case when one aircraft tows another it is necessary to cast off the tow line after the towing function has been performed. It is important that the separation of the tow line from the towed aircraft be as close to the towed aircraft as possible in order that there shall be no fouling of propellers or controls on the towed aircraft, such as would of necessity occur if the towing cable be released at or near the tug.

Casting off the towing cable by an operator on the towed aircraft is, of course, common practice but in the present case does not cover all of the conditions which may arise.

Where the need of casting off the tow line is known to those in the towed aircraft, no difficulty arises, but when some emergency occurs by reason of which it is necessary for the air tug to cease towing, and in particular where there is danger of the drum-carried cable on the air tug unreeling completely from the surface of its drum, it is necessary that the cable and the pick-up line and leader be disconnected at the point at which the leader is attached to the towed aircraft. Part of my invention is directed to a quick, effective and reliable means and method by which one in control on the tug can disconnect the tow line at the towed aircraft. The structure by which I prefer to accomplish this is shown in Figures 31–36.

Figures 31 to 36 inclusive show the same general form of tow line fastener and release but with different throwing mechanism. It is togglelocked and is adapted for automatic release of the towing line at its rear end (at the tow end) to protect, for example, against casting off the tow line or cable from its drum on the tug. This form has been selected because to the best advantage it illustrates automatic release of a cable at the towed aircraft by means operable from the air tug. Other emergencies merely require opening the control circuit on the tug or on the tow.

Figures 31 and 32 illustrate the same holding and release mechanism of Figures 34 and 35 in closed (holding) and open (released) position adapted for simple hand operation.

A holder or shell 94 is recessed from the exterior at 95 to receive a rope or cable terminal. This may be a mere noose or bend in the end of the cable or a fitting such as ring 63 upon the outer end of leader 60. Across the recess to engage the ring and hold it in place moves a bar, prong or catch 96 carried by catch lever 97. The catch lever 97 is conveniently pivoted to swing about a center 98. Pull upon the ring 63 will not release the hold, as disconnection requires reverse swinging of the catch lever.

I swing the catch lever by toggle mechanism comprising a link 99 pivoted to the catch lever at 100 and an arm 101 pivoted to link 99 at 102 and forming part of a rocker arm, the other arm of which 103 is thrown to operate the toggle. The rocker arm turns about bolt 104 as a pivot.

In Figure 31 the toggle is closed and locked in position and is held in this position by counterclockwise stress of spiral spring 105 upon arm 103. In Figure 32 the toggle is open.

The means shown for throwing the operating lever in these two figures is conventional, through a rope 106 and handle 107, permitting hand throwing either locally or from a distance within the towed aircraft. The rope 106' in Figure 34 may be the same rope except that it is pulled hydraulically.

In Figure 34 the catch and release are intended to be of the same general character as in Figures 31 and 32 but the toggle levers are controlled hydraulically by means of a pump 108, pressure tank 110, exhaust tank 109 and a valve 111 connected by suitable conduits. The valve controls pressure to and from a cylinder 112 whose piston 113 pushes lever 114. When valve 111 is turned to connect the cylinder with the exhaust, piston 113 is returned to its initial position (to the left in the figure) by the pull of spring 115. The piston rod is connected to the lever at 116 and one end of the spring is connected to the lever at 117 and the other end to a fixed point at 118. The lever is fulcrumed at 119 and its short end is connected at 120 to rope 106'.

With the connections as shown the valve 111 can be turned by hand or by any other means to a point at which the position of the lever 114 is determined by the pull of spring 115 so that the rope 106' is slacked and the latch remains closed or is closed by stress of the spring 105. The parts will therefore remain generally in the position shown in Figure 34 until operation of valve 111 brings pressure to bear upon piston 113. This pressure throws the lever 114 in counterclockwise direction as seen in Figure 34, bringing tension upon the connection 106', swinging the arms 103 and 101 in clockwise direction to open the latch to the position seen in Figure 32.

The latch can therefore be opened by hand either by turning valve 111 or by turning lever 114 in counterclockwise direction and can be operated from a distance by any mechanism which will turn the valve 111.

In Figure 34ª turning mechanism for the valve 111' is shown which is capable of distant control in the same general manner as is more clearly described in connection with Figure 35. For this reason so much only of this mechanism in Figure 34ª will be illustrated and described as makes it possible for its operation to be thoroughly understood by comparison with the illustration at the left in Figure 35.

In the valve 111' the valve plug 121 is shown as having valve passage 122, adapted when the valve is turned to connect conduit 123 leading to the pressure tank 110 with conduit 127 leading to the cylinder. Valve passage 124 connects, as shown, conduit 125 leading to the exhaust tank 109 with conduit 127 leading to the cylinder. Passage 126 continues to be connected with the cylinder whether inlet or exhaust conduit is in line with either passage 122 or passage 124.

As will be seen in the position shown, the operating end 128 of the cylinder is connected to exhaust conduit 125. With slight clockwise movement, the operating end of the cylinder will be connected with pressure conduit 123 thereby displacing the piston to the right, shifting the lever 114 against the tension of spring 115 and breaking the toggle.

The valve operating lever 129 is urged to the left, i. e. in clockwise direction by spring 130 anchored at 131 but is restrained from this movement by catch 132. The position of the catch and valve in Figure 34ª corresponds to the closed toggle position in Figures 31 and 34. When solenoid 133 is operated by distant control—as, for example, in Figure 35—the catch is released and the latch is thrown by spring 130 in clockwise direction to allow pressure to be exerted on the piston thereby opening the toggle. A stop 134 prevents overtravel of the valve plug.

In Figure 35 fragmentary portions of two aircraft are shown, one towing (air tug) 45' and the other the tow in process of being launched, indicated at 44². An electrically conducting cable 49' forming a section of the tow line pays out from a drum such as 84 (Figure 37) in aircraft 45'.

Both aircraft are modified so that mechanism on the towing aircraft provides remote control of a release carried by the towed aircraft. The release shown may be and for simplicity of illustration is assumed to be substantially the same as that in Figures 31 and 32 with the exception that the arm 103 of these figures becomes a latch 103' which is held in place by a catch 135 comparable with catch 132 in Figure 34ª. This catch is withdrawn to release the latch by the armature 136 of solenoid 137.

In an emergency, such for example as that created when the towing cable has been payed out excessively and is in danger of being cast off the drum, the solenoid is operated by a relay circuit 138 using local battery 139. The local circuit, normally open, is closed by a switch operated by a radio receiver or manually by switch 141.

The radio receiver is so turned that it receives impulses from a radio broadcaster 140 on the towing aircraft.

The broadcaster carries its own suitable source of electric current. As it is primarily for emergency use it is held inoperative by maintaining its circuit normally open. This is done in the illustration by a local circuit 142. The local circuit is intended to be controlled automatically but it, as well as the broadcaster circuit, can be operated manually to transmit a signal either directly, through hand switch 143 which closes the broadcaster circuit 144, or indirectly, by switch 145 which opens the local circuit 142.

When the relay 146 is energized—as is normally the case—its armature 148 is pulled down against the pressure of a spring 147. The spring engages the head of the armature which is in the form of a switch bar 149. In the absence of current in the circuit the switch bar engages contacts 150 in broadcaster circuit 144.

My invention contemplates fully automatic control over the broadcaster to the extent that at any predetermined length of cable pay-out desired, the relay shall be de-energized to transmit a signal from the broadcaster on the tug to the towed receiver.

The broadcaster control relay is operated by an electric current from battery 151, one terminal of which is grounded at 152 to the tow aircraft structure. The other terminal is connected to the relay 146 and from thence to pulley 90 through normally closed switch 145. The struts 154 and 154' supporting pulley 90 may be insulated at convenient points such as 155. From the pulley the current passes to the cable 49' and then returns to ground 156 through the drum and winch support not shown.

It will be understood that the struts 154 and 154' of Figure 35 may be the same as struts 91 and 93 of Figure 37. The need of incorporating an insulated pulley in the guide mechanism of Figure 37 or of installing an additional pulley depends on each individual installation.

So long as current continues to pass from battery 151 through relay 146 and the cable to ground, the relay will continue to draw its armature down, maintaining the broadcasting circuit open; however, when the cable has been payed out to a dangerous extent, a length of insulation 157 previously set upon the cable at the desired point passes over the pulley 90, interrupting the circuit through the relay winding and causing the broadcasting circuit to be closed through its otherwise open contacts. The broadcasting impulse is then transmitted.

The radio receiver acts from this impulse, the solenoid 137 is operated and the cable is released.

In Figures 41 and 42 the structure of Figure 39 is modified to provide release of the tow line from a secondary winch on the towed aircraft by remote control from the towing aircraft.

A local circuit on the towed aircraft correspoding closely with the remote control shown in Figures 34ᵃ and 35, actuates the armature of a solenoid which is remotely controlled to remove the braking force from the secondary drum thereby allowing the leader or tow line to unwind rapidly therefrom.

In Figure 41 a spring 161' corresponds with spring 161 of Figure 39 but instead of abutting a washer attached to rod 166, spring 161' abuts flanged collar 205 which in turn abuts an annular helical spring key 207 held in position by retaining sleeve 208.

The pressure of spring 161' in normal operation is transmitted through flanged collar 205, helical spring key 207, grooved sleeve 206, to rod 166'.

To provide remote controlled release of the pressure of brake spring 161' the armature of a solenoid 137' responsive to radio signals in a similar manner as illustrated in Figure 35 is connected to slidable sleeve 210 through cable 211 and tab 212. When the solenoid circuit is closed, sleeve 210 is displaced to the left in the figure until it abuts the flange on retainer 208 and forces the retainer to the left against the pressure of spring 209. This in turn allows helical spring key 207 to expand outwardly from its seat, premitting collar 205 to slide on sleeve 206 thereby relieving pressure of spring 161' on the brake discs 159 and 160 in Figure 38 and allowing the leader to pay out.

When reference is made herein to operation of a mechanism through a solenoid within a circuit, the reference is intended to cover any electrically operated device within such a circuit and a solenoid is referred to because of its adaptability for this use and its low cost.

It has not been necessary to devise novel broadcasting and receiving control units since many structures and methods of operation are known for distant control by broadcasting transmitters acting through receivers which respond to the transmitter impulse to close a local circuit. All that is necessary, therefore, is to provide for closing normally open contacts in the transmitter circuit on the towing aircraft thereby correspondingly closing the local circuit upon the towed aircraft by operation of the receiver mounted thereon.

It is recognized that many impulse-transmitting mechanisms are available along with receiving mechanisms which are used in connection with them.

In order that there may be no question about the full operativeness of this part of my mechanism I would state that any transmitter capable of operating a relay by means of a receiver, with any relay capable of operating a solenoid under remote control conditions will serve the purpose here.

Among a great many of those which are known and available I would refer to a few patents which disclose remote control systems of suitable character. See Hammond 1,653,172, in which the relay of the radio receiver would serve a like purpose here, so that with radio impulse a local battery will operate through the solenoid; Walker, 2,178,089 in which any of the combinations of the radio receiver would be effective to throw current to the solenoid; Gray 2,157,719 in which the receiving device of Figure 2 could operate the relay instead of the lamp; and Cumming 2,214,101 in which any one of the control switches proposed could be used for the present purposes.

Since the time of the broadcast and therefore the time of release of the catch in Figure 35 is dependent upon the position of the insulation upon the tow line, the release of the tow line will take place at any predetermined point and is automatic.

The motor and drum constructions of Figures 37 and 38 are effectively special winches, and, although having much in common, differ slightly. Figures 38, 39 and 40 are partly diagrammatic.

Describing the form in Figures 38, 39 and 40: The drum 84' affords a support for the cable 49 upon which it is wound and from which it is payed off as the stress from the launching of the aircraft requires. The resistance to pay-off at the start is relatively small but increases progressively until the aircraft launched is not only air borne but is towed at the same speed as the speed of the air tug.

The drum and the brake support 158 are frictionally connected through annular brake discs 159 and 160 which are interleaved and are connected alternately one set to the drum and the other set to the brake support. These discs permit relative movement of the brake support and the drum subject to the friction between the discs, which friction as later pointed out increases automatically when pressure of brake spring 161 is applied through brake levers 162 fulcrumed at 163, keys 164 and pressure plate 165.

The pressure of spring 161 is applied gradually to the levers 162 through a rod 166, tube 167 and washer 168. The washer bears against the tips of the levers 162 (see Figure 39) causing them to swing about their outer end fulcrums. The relative positions of the tube 167 and the rod 166 may be adjusted by means of a brake spring adjusting nut 169 which is threaded on rod 166 and bears against the tube 167. When the nut is turned the pressure of spring 161 may be increased or decreased.

The axial movement of tube 167 which applies pressure to brake levers 162 is controlled through a double yoke 170 pivotally attached to a coupling 171 which is welded to tube 167. The yoke 170 is pivotally connected at its opposite end to a cam 172 upon a threaded shaft 173 suitably supported.

When the nut 180 is turned on the threads 174 of shaft 173 by handle 175, cam 172 is displaced to the left in the figures. This in turn operates yoke 170 (Figs. 39 and 40) counterclockwise and displaces tube 167 and rod 166 axially to the right thereby removing spring pressure from brake levers 162. In this position, the winch is set for a pickup.

As soon as contact is made and the line begins to pay out, gear 176 secured to the drum turns gear 177 with which it is meshed and thereby turns shaft 173.

The nut 180 is prevented from turning with the shaft 173 by means of a dog 178 and handle 175. The nut is displaced to the right in Figure 38. Cam 172 is urged against nut 180 by spring 161 acting through rod 166, nut 180, collar 171 and yoke 170. In the above manner the controlled displacing of the nut 180 on shaft 173 permits the brake spring pressure to be applied to brake discs 159 and 160.

Arm 181 carrying pins may be turned so that the pins will cooperate with cam faces 182 thus permitting various initial displacements of nut 180. In this manner the number of turns made by drum 84' from the instant the line starts to pay out until the brake is fully applied may be regulated. A conventional level wind device indicated by 186 is also driven from gear 176 through shaft 187 and chain and sprockets. It has no part in my invention.

The reversible electric motor 183 drives the various mechanisms involved including the brake discs, and brake support from pinion 184 through ring gear 185.

The unit shown in Figure 38 per se, that is aside from the combinations into which it enters in my present application, is the invention of Arthur B. Schultz who has filed an application for patent upon it having Serial No. 472,600, filed January 16, 1943.

Insofar as may be necessary to complete the disclosure of this application, the Schultz application is incorporated by reference.

The structures of the hook and hook retainer seen in Figures 27, 29 and 30 are also the inventions of others.

Arm 48 carries a track 186 along the rear of the arm from a point accessible at the airplane so that the hook 47 may be threaded upon it and may be guided by the track while the hook is slid down to a hook retainer shown in Figure 27 at the lower end of the arm. For this purpose a face of the hook is formed as a T-slotted guide 187. The track stops at the upper end of the hook retainer.

The hook retainer takes over the control of the hook, holding the guide 187, and hence the hook, in place yieldingly and permitting the hook to be withdrawn when stress from the take-off exceeds the predetermined resilient resistance of the retainer.

The body 188 of the arm is tapered towards the end supporting the hook retainer and is, therefore, preferably made of wood to facilitate this construction and to save weight.

The flanges 186' of the track 186 are partly enclosed within the overhanging edges 187' of the guide 187.

As the hook guide 187 frees from the track it passes within a pocket in the hook retainer. The pocket is flanked by spring side plates 189, 190, inwardly turned at the top to form lips 191 and 192. These lips engage the upper outer surfaces $187^2$ of the hook guide and resiliently restrain the hook guide, holding the hook to the arm while the guide is passing from the track and after the guide has passed beyond the lower end of the track.

The spring side plates 189 and 190 are reinforced on the outside by spring supports 193. These extend to the end of the hook retainer, and at the rear of the plates are further supported by short straps 193' riveted to the arm through the spring supports and the spring side plates.

Inside the spring side plates is a supporting and stiffening channel strip 194 shown in section in Figure 29 as of inverted U-shape. The bar of the U limits the upward movement of a spring detent 195 whose upwardly turned spring end 196 forms the detent and restrains withdrawal of the hook from the end of the hook retainer.

The spring 195 and its upturned end act as a tongue. During withdrawal of the hook from the hook guide the tongue is downwardly sprung by the hook guide into a space 197 cut away from the material of the arm. As thus constructed the hook guide can pass out to the right in Figure 27 when the stress upon it is strong enough for the purpose.

The actual release occurs sometime after the contact of the hook with the pick-up loop or line and between that time and the time when towing stress is brought upon the aircraft to be towed. After the release takes place the hook is supported wholly by the towing line 49 through clevis 198.

The spring side plates and tongue give considerable flexibility to the hook support so that the hook can leave the support directly at the bottom or by torsion, springing the lips to assist in the release, or by a combination of these.

The hook body 199 connects with a tapered gathering prong 200 which guides the pick-up loop or line into a recess 201 having end pockets 202, 203.

Elastic inserts within the loop or line would be quite desirable but springs and rubber ropes or cables cannot be used in the pick-up because though they yield very desirably their immediate recovery after stretching causes them to throw the loads picked up almost as projectiles.

I contemplate using a special material within the tow line, preferably in the pick-up loop or line or in the leader to absorb energy without the objectionable spring-like rebound, etc. Materials which have this ability to absorb shock without this rebound are found among synthetic linear condensation polymers, vinyl type plastics, rubber hydrochlorides, cellulose esters and cellulose. Several of them have well known trade names such as Nylon, "Vinyon," "Fortisan," "Saran," and "Laminite."

These materials have to a greater or lesser degree, nylon to a comparatively high degree, the characteristics of good elasticity (ability to return to normal length after being stretched), long elastic memory (hysteresis or energy absorption) combined with high percentage elongation. It is desirable that such a material have at least 10% elongation under maximum working stress. However, there is no objection if the material has up to several hundred percent elongation provided it has the other characteristics. In the case of Nylon, it has been found that elongation under maximum working stress will run between 20% and 40% depending upon the composition of the particular Nylon.

The above characteristics permit the line to yield considerably under stress but to return slowly after the accelerating force is removed, thus preventing overshooting or rebound of the load.

With the use of one or some of these materials, I am able to cushion the shock of initial impact when the pick-up loop or line is stretched, thereby relieving the stress while the inertia of the drum and pay-out cable of the tub at one end and the inertia of the moving, but slowly moving, assisting tow at the other end are being overcome.

It will be understood that the shock absorbing characteristic of the materials suitable in my invention provides relatively long elastic memory as compared with rubber or a steel spring; nevertheless, there is a substantial recovery within a few seconds after the load has been removed. This permits successive pick-up or launching operations with the same tow line.

With a large and heavy aircraft to be launched, it may also help to overcome the inertia of a second (smaller) drum and pay-out cable, carried upon the aircraft to be launched.

The length of pay-out of cable may also be reduced.

Thus I have applied the efficient shock-absorbing properties of Nylon and similar materials to the launching of an aircraft by means of another craft in full flight. The energy absorption within the loop or line and the pay-out of cable from a drum on the tug, and in certain cases the pay-out of cable from a drum on the towed aircraft having less inertia than that of the drum and cable on the tug, all contribute to relief of the shock of the pick-up, acting substantially in series to accomplish this purpose and to the best advantage quickly and smoothly to accelerate the launching of an aircraft.

Nylon as described herein is a synthetic linear condensation polyamide which has been cold-drawn so as to develop a very strong tendency to contract to its former length after it has been stretched.

Having thus described my invention what I claim as new and desire to secure by Letters Patent is:

1. In an aircraft launching system, an aircraft intended to be launched, releasing supports for a line mounted upon the upper surface of the aircraft, and a towing line supported from said supports and extending free from interfering aircraft structure in a direction transverse of the aircraft's direction of travel.

2. In an aircraft launching system, an aircraft intended to be launched, a pair of posts mounted upon the upper surface of the aircraft, and a towing line supported from said posts and extending transversely of the aircraft's direction of intended travel.

3. In an aircraft launching system, an aircraft, a towing line, pole means for spreading the line and mounted upon the upper surface of the aircraft, and connections from the surface of said aircraft to the line released by pull on the line, whereby when the line is caught by a towing aircraft the spread part of the line is freed from connection with the upper surface of the aircraft.

4. In apparatus for launching one aircraft with the assistance of another aircraft, an airplane body having an upper surface, wings empennage, and power plant, a launching line releasably mounted on and attached to the airplane to form a stretch above the upper surface of the body, a towing aircraft having a depending arm, a tow cable, and a hook fastened to the end of the cable directed by the arm and adapted to pick up the spread of said launching line during flight of the towing aircraft.

5. Spaced poles mounted upon an aircraft to be launched by means of another aircraft, a launching line supported by the poles and holding the poles in place, clips on said poles for releasably holding the launching line and sockets for supporting the poles permitting the poles to pass out therefrom as the launching line is disengaged from the clips.

6. On an aircraft adapted to be launched, sockets upon the upper part of the aircraft and having openings from the sockets away from each other adapted to permit fall of poles from the sockets outwardly, poles mounted one within each socket, a towing loop having a towing connection with the airplane at one end and spread by the poles, and clips connected with the poles engaging the loop, the loop being adapted to be freed from the clips by pulling upon the loop and then permitting the poles to fall free of the sockets.

7. On an aircraft to be launched by means of another aircraft, a launching line, spaced poles for supporting said launching line, said poles being of loosely fitting telescopic construction whereby the poles collapse in the absence of lateral pull, and clips on said poles for releasably holding said launching line, the pull of said launching line being used to hold the poles in extended position taut whereby the poles are adapted to collapse when the pull of the launching line is removed.

8. In an aircraft launching system, an aircraft to be launched by means of another aircraft, a launching line, spaced poles for supporting said launching line, said poles being of telescopic construction, hydraulic means for extending the telescoping parts of said poles, and clips on said poles for releasably holding a launching line.

9. In an aircraft adapted to be launched, sockets upon the upper part of the aircraft, poles adapted to fit releasably within the sockets and a towing loop connected to one end of the aircraft, spread between and connected to said poles, whereby when the loop is caught by a towing aircraft the poles are pulled from their sockets by stress upon the loop and are suspended from the loop during towing of the plane.

10. In launching apparatus for aircraft, a towing aircraft, a pick-up loop carried by the aircraft to be launched, a shock absorbing winch in said aircraft having a towing drum and brake mechanism carried by the towing aircraft, a tow rope carried by the drum and terminating in a hook, pay out devices on said winch for decreasingly paying out said tow rope from said drum and connections carried by the aircraft to be launched and comprising supports carried by the said aircraft to be launched, extending above the upper surface of said aircraft and adapted to hold the towing loop of said aircraft to be launched in transverse position to be picked up by the towing hook.

11. In a launching system for aircraft, an aircraft adapted in flight to pick up the aircraft to be launched, a metallic towing cable thereon, a drum on which the cable is mounted, a switch, a broadcaster upon said aircraft having a circuit adapted to be closed by the switch, a relay circuit maintaining said switch in open position when the current is on said circuit, a battery and connections for said relay circuit passing current through said relay and through a portion of said cable length and insulation means carried by said cable for interrupting the circuit through the relay when a predetermined length of cable has been payed out thereby causing said broadcaster to transmit an impulse.

12. In a system for automatic control of a circuit upon a towed aircraft, a towed aircraft, a towing aircraft, a transmitting circuit on said towing aircraft adapted to broadcast when current passes through said circuit, a receiving circuit on said towed aircraft, a local relay circuit on said towed aircraft operated in response to impulses from the towing aircraft, and electromagnetic means actuated when a predetermined amount of towing cable has been payed out, the means so constructed and arranged that the radio impulses are transmitted to the said receiving circuit on the towed aircraft.

13. In a system for automatic control of a circuit upon an aircraft to be towed by an aircraft in flight, an aircraft to be towed, a towing aircraft, an electrically conducting towing cable, a transmitting circuit on the towing aircraft adapted to broadcast when current passes through this circuit, a receiving circuit on the aircraft to be towed, a local relay circuit operated in response to impulses from the towing aircraft, electromagnetic means controlled by electric current through said towing cable for opening the transmitting circuit, and means for insulating the towing cable to cause the electromagnetic circuit to open, whereby the transmitting circuit is permitted to close.

14. A towing aircraft, a tow line, a broadcaster, a towed aircraft, a radio receiver thereon, a fastening for the line thereon, a lever by which the fastening is closed, a spring tending to open the lever, a radio receiver solenoidal operating means for release of the fastening controlled by the receiver; the broadcaster and towing line being mounted upon the towing aircraft and the other elements mounted upon the towed aircraft.

15. In mechanism for launching an aircraft, an aircraft to be launched, a main shock absorbing winch including a drum, tow cable, brake for the drum and means for reeling in cable which has been payed out from the drum, all located on the aircraft to be launched, and a launching aircraft having a relatively small winch for accelerating the drum of the main winch including a drum, towing cable, brake for the drum and means for reeling in the cable which has been payed out from the drum, whereby cable may be payed out from both drums, the drums may be braked and the cable may be reeled in on both drums.

16. The method of assisting the take-off of a first aircraft by a second aircraft, which consists in supporting a towing line in a transverse position upon the first aircraft, in picking up the line by a towing aircraft in flight, in pulling the tow line free from its support and at the same time releasing the support from the first aircraft and in continuing to tow the towed aircraft while manipulating the controls of the towed aircraft so as to cause it to be air borne.

17. In the method of launching aircraft, the steps which consist in supporting and stretching a take-off line upon and above said aircraft in position to be picked up, in picking up the take-off line by an aircraft in flight, in manipulating the controls of the aircraft to be launched so as to cause it to be air borne and in disengaging the take-off line at the aircraft to be towed by control effected from the aircraft in flight.

18. In the method of launching aircraft, the steps which consist in supporting and stretching a take-off line upon and above said aircraft in position to be picked up, and concurrently using the stretching of the line to hold the support in position upon the said aircraft to be launched, in picking up the take-off line by an aircraft in flight, and concurrently releasing the line support and in manipulating the controls of the aircraft to be launched so as to cause it to be air borne.

19. The method of assisting the take-off of a first aircraft by a second aircraft, which consists in supporting a towing line in a transverse position from the first aircraft, in picking up the line by a towing aircraft in flight, in pulling the tow line free from its support and at the same time pulling the supports free from the craft towed, in carrying the supports along with the tow line and in manipulating the controls of the aircraft to be launched so as to cause it to be air borne.

20. The method of assisting a first powered aircraft by a second aircraft in flight, both aircraft having drum wound tow lines and means for allowing the tow lines to pay out, for braking the drums, which consists in picking up the tow line of the first aircraft to be launched by the tow line of the second aircraft in flight; in paying out both tow lines, and in concurrently retarding the tow lines while using the power of the first aircraft and its controls to assist in bringing it into the air at speed.

21. In the method of towing a first aircraft by a second aircraft in flight, the steps which consist in picking up a towing loop from the first aircraft by a towing aircraft in flight, in continuing the flight of the second aircraft to tow the first aircraft and in releasing the tow rope from the first aircraft at its towed end by energy supplied from the towing aircraft.

22. The method of controlling an automatic broadcaster transmitting impulses from a towing aircraft having a metal towing cable wound upon a drum which consists in electromagnetically rendering the broadcasting circuit inoperative by electric current passing through a circuit including a stretch of the metal towing cable and opening this circuit through the cable by insulation carried by the cable and at a time determined by the position of the insulation on the length of the cable.

23. In an aircraft launching and towing system, a first aircraft acting as a tug, a radio broadcaster carried thereby, means for operating said broadcaster to give a broadcast therefrom, a radio receiver carried by a second aircraft to be launched and towed, a towing connection between the aircraft, a movable holding device by which the connection is secured to the aircraft to be towed, hydraulic means for shifting said holding device to cast off the connection at the aircraft to be towed, a valve operating the hydraulic means, spring means tending to operate the valve and electromagnetic means connected with the valve and energized by an impulse within the receiver whereby a transmitted impulse from the first aircraft actuates the solenoid and permits the spring to operate the valve.

24. In a mechanism for launching and towing an aircraft, a first aircraft comprising a tug, a second aircraft adapted to be launched and towed, drums and cables thereon, one drum and cable on each aircraft, a pick-up and towing line connecting the outer ends of the two cables, brakes adapted progressively to be applied to the two cable drums to permit limited pay-out from the drums and then to stop pay-out, and remote control means including a transmitter on the first aircraft and a radio receiving instrument and local circuit on the second aircraft for releasing the brake upon the drum of the second aircraft, whereby the said drum of the second aircraft is free to pay out all of the cable upon said drum and wholly disconnect the second aircraft.

25. In a system for disconnecting a towing aircraft and an aircraft to be launched and subsequently towed, including a tug aircraft having a drum-wound cable, and an aircraft to be launched and a pick-up line connected therewith, in which the pick-up line is connected with the second aircraft to be launched by a movable bar, and the towed aircraft has a local disconnecting circuit, the method which consists in hydraulically controlling the position of the bar to connect or disconnect the pick-up line in operating the hydraulic mechanism by a valve, in spring-predisposing the valve toward disconnecting valve position, in holding the valve in position such that the tow line continues to be connected with the second aircraft, in electromagnetically releasing the valve to permit spring disconnecting operation of the valve and in passing current through the local circuit upon the second aircraft by an impulse transmitted from the first aircraft and received upon the second aircraft.

26. In a launching and towing system for aircraft, a first aircraft comprising a tug in flight and a second aircraft intended to be launched and subsequently towed, each having a drum, a cable wound upon the drum, and a brake restricting the length of pay-off of cable from the drum, and the second aircraft having a pick-up line connected with the outer end of its cable, the method of launching, towing and subsequently disconnecting the second aircraft which consists in connecting the pick-up line of the second aircraft to the outer end of the cable of the first aircraft, manipulating the controls of the second aircraft while paying out cable from both aircraft restrictedly to launch the first aircraft and subsequently disconnecting the tow aircraft at its drum by remote control from the first aircraft by broadcasting an impulse from the first aircraft, picking up the impulse by radio reception upon the second aircraft, and in relaying the impulse picked up and using it electromagnetically, to release the drum brakes of the second aircraft and permit its cable to pay out wholly from the drum of the second aircraft.

RICHARD C. DU PONT.

REFERENCES CITED

The following references are of record in the file of this patent:

UNITED STATES PATENTS

| Number | Name | Date |
|---|---|---|
| 986,644 | Rentschler | Mar. 14, 1911 |
| 834,658 | Chanute | Oct. 30, 1906 |
| 1,792,937 | Sperry | Feb. 17, 1931 |
| 2,124,867 | Akerman | July 26, 1938 |
| 2,252,554 | Corothers | Aug. 12, 1941 |
| 1,459,884 | Goodin | June 26, 1923 |
| 1,908,408 | Cox | May 9, 1933 |
| 2,102,604 | Arndt | Dec. 21, 1937 |
| 1,458,710 | Kolczewski | June 12, 1923 |
| 1,735,385 | Fisher | Nov. 12, 1929 |
| 2,014,557 | Clampitt | Sept. 17, 1935 |
| 2,131,610 | Arndt | Sept. 27, 1938 |
| 2,250,153 | Cooper | July 22, 1941 |

FOREIGN PATENTS

| Number | Country | Date |
|---|---|---|
| 292,826 | British | June 28, 1928 |
| 506,680 | British | June 2, 1939 |
| 103,585 | Swiss | Feb. 16, 1924 |

OTHER REFERENCES

Publication "Aeroplane," Nov. 15, 1940, pages 552–555. (Copy available in Class 244–3, Division 22.)